United States Patent [19]
Pearl

[11] Patent Number: 6,094,983
[45] Date of Patent: *Aug. 1, 2000

[54] GAUGE HAVING AN INDICIA-BEARING INSERT

[75] Inventor: Douglas B. Pearl, Fort Lauderdale, Fla.

[73] Assignee: Uniweld Products, Inc., Fort Lauderdale, Fla.

[*] Notice: This patent issued on a continued prosecution application filed under 37 CFR 1.53(d), and is subject to the twenty year patent term provisions of 35 U.S.C. 154(a)(2).

[21] Appl. No.: 09/067,527

[22] Filed: Apr. 28, 1998

[51] Int. Cl.⁷ .......................... G01D 11/24; G01L 19/14; G01P 1/02
[52] U.S. Cl. ............................................................ 73/431
[58] Field of Search .............................. 73/700, 708, 741, 73/756, 866.1, 740, 431

[56] References Cited

U.S. PATENT DOCUMENTS

| | | | |
|---|---|---|---|
| 4,873,864 | 10/1989 | Huang | 73/146.8 |
| 5,063,749 | 11/1991 | Manz | 62/149 |
| 5,471,881 | 12/1995 | Hochstein | 73/700 |
| 5,679,903 | 10/1997 | Mock | 73/740 |

*Primary Examiner*—William Oen
*Attorney, Agent, or Firm*—Nields, Lemack & Dingman

[57] ABSTRACT

Dial face insert properly indexed or keyed so as to tightly fit into a correspondingly indexed or keyed housing. In a preferred embodiment, the dial face includes one or more reference scales printed thereon, such as a temperature scale. The housing to which it is indexed may be the gauge body, the gauge face or the gauge cover.

9 Claims, 6 Drawing Sheets

GAUGE HAVING AN INDICIA-BEARING INSERT

BACKGROUND OF THE INVENTION

Gauges, such as pressure gauges, are commonly used in various technological fields for a variety of purposes, such as refrigeration, measuring force, measuring contents left in a cylinder, measuring water pressure, line pressure, etc. Such gauges generally include a pointer moveable relative to a calibrated dial. By way of example, refrigeration technology often requires the introduction of one or more refrigerants into apparatus. This procedure is somewhat dangerous, and requires pressure and temperature monitoring. Monitoring is usually accomplished with a manifold gauge assembly comprising a high pressure gauge and a low pressure gauge attached to a common manifold to allow for simultaneous high and low pressure monitoring. The gauges also include a temperature scale; each refrigerant having a particular pressure/temperature relationship. However, the particular temperature scales used on the gauge dials vary, and are a function of the identity of the refrigerant. For environmental reasons, recently there have been used a large number of different refrigerants, thereby requiring an equal number of temperature scales. However, the physical size of the gauge face usually prohibits or inhibits the provision of many multiple scales thereon.

Since it is impracticable and uneconomical to have a different gauge for each refrigerant, various methods have been contemplated for providing a single gauge adaptable to various refrigerants. For example, a universal scale can be used, with appropriate conversion factors available depending upon the particular refrigerant. However, this procedure is tedious and inconvenient, and requires that the operator always have available the appropriate conversion charts for the specific refrigerant being used. It is also prone to operator error.

U.S. Pat. No. 5,471,881 discloses a lenticular gauge face which incorporates multiple reference scales on a single standard manifold gauge face. Thus, a lenticular film is laminated over a gauge face image containing two different temperature scale images. Angling of the gauge allows viewing of one or the other of the distinct images.

U.S. Pat. No. 5,679,903 discloses a refrigerant monitoring set including a manometer and a transparent disk mountable on the outside of the windowed face of the manometer housing. The transparent disk includes at least one temperature dial for a given refrigerant which can be assigned to a pressure dial on the manometer face by means of zero-position alignment.

However, the foregoing solutions suffer from various drawbacks, including cost, difficulty in obtaining accurate readings, etc. Nor are these problems limited to gauges used in refrigeration.

It would therefore be desirable to provide a means for providing multiple reference scales on a single gauge or manifold without the concomitant problems of the prior art.

SUMMARY OF THE INVENTION

The problems of the prior art have been overcome by the present invention, which provides a dial face insert properly indexed or keyed so as to tightly fit into a correspondingly indexed or keyed housing. In a preferred embodiment, the dial face includes one or more reference scales printed thereon, such as a temperature scale. The housing to which it is indexed may be the gauge body, the gauge face or the gauge cover.

In another embodiment, the dial face bears indicia of time, and the housing is a watch. Thus, dial face can be removably inserted when the user enters a different time zone. Other embodiments include meters, such as electrical meters, where various scales are calibrated differently.

DETAILED DESCRIPTION OF THE INVENTION

Figure 1:
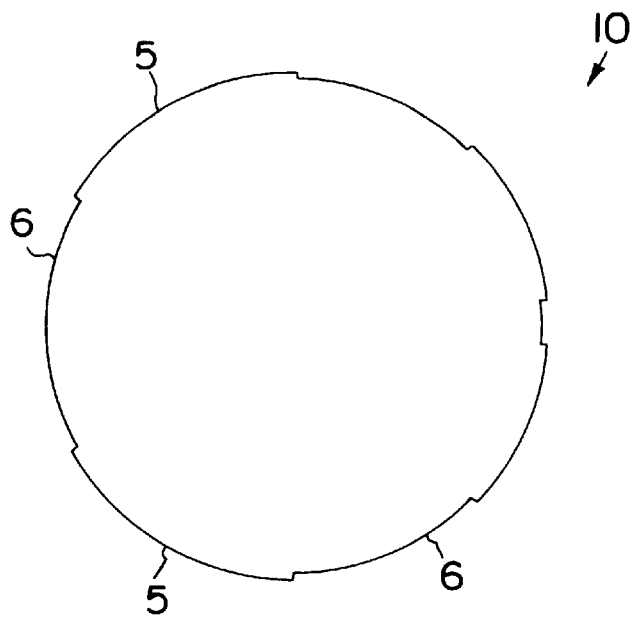
FIG. 1 is a top view of one embodiment of a dial face in accordance with the present invention.
Figure 2:
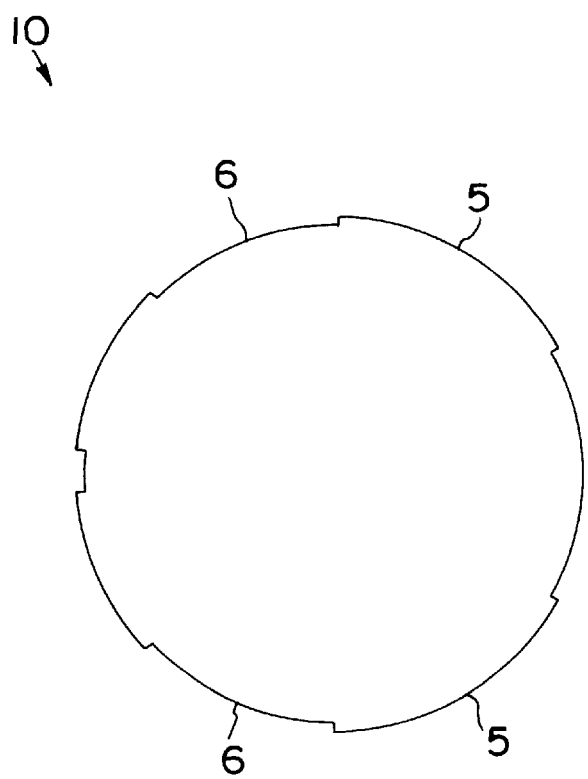
FIG. 2 is a top view of another embodiment of a dial face in accordance with the present invention.

Turning first to FIGS. 1 and 2, there is shown a suitable dial face insert 10, generally circular in configuration, preferably made of plastic. Those skilled in the art will appreciate that the particular configuration of the insert 10 need not be circular; it can be configured in any particular form to match the configuration of the device in which it is inserted. For purposes of illustration, generally circular gauges will be illustrated herein, although the invention is not to be so limited.

The type of plastic used is not particularly limited, although the insert 10 should be at least mostly transparent, allowing the user to see the indicator and/or optionally any other pertinent markers or information in the apparatus itself behind the insert 10. In some instances it may be desirable that only the indicator be visible, and not the indicia on the dial face underneath the indicator, especially where visibility of the dial face would lead to confusion in reading the appropriate measurement from the insert. In such cases, the insert 10 can be partially or completely frosted or otherwise made partially or completely opaque. The insert 10 should be rigid enough to be stabilized in the apparatus once locked in place. Suitable materials of construction include polycarbonate, acrylic, acetate, polyesters and other plastics. The insert 10 can be formed by any suitable method, such as stamping, cutting, molding, etc. The insert 10 has indicia printed, laminated, adhered or otherwise formed thereon, such as a temperature scale, a pressure scale, a time scale, etc. Preferably the indicia is circumferentially oriented with respect to the axis about which the indicator rotates, and is properly coordinated with the indicator so that when the insert 10 is locked in position, an accurate reading can be obtained.

In accordance with the present invention, the insert 10 is preferably planar or substantially planar and has an irregular perimeter. One or more protuberances or projections 5 are formed along the perimeter, forming corresponding recessed portions 6. The projections 5 (and recessed portions 6) are irregularly spaced and are not all the same length, so that the insert 10 is keyed and can fit in the corresponding housing in only one position, as will be discussed in greater detail below. When in position, preferably the insert 10 is aligned with the existing dial face.

Figure 3A:
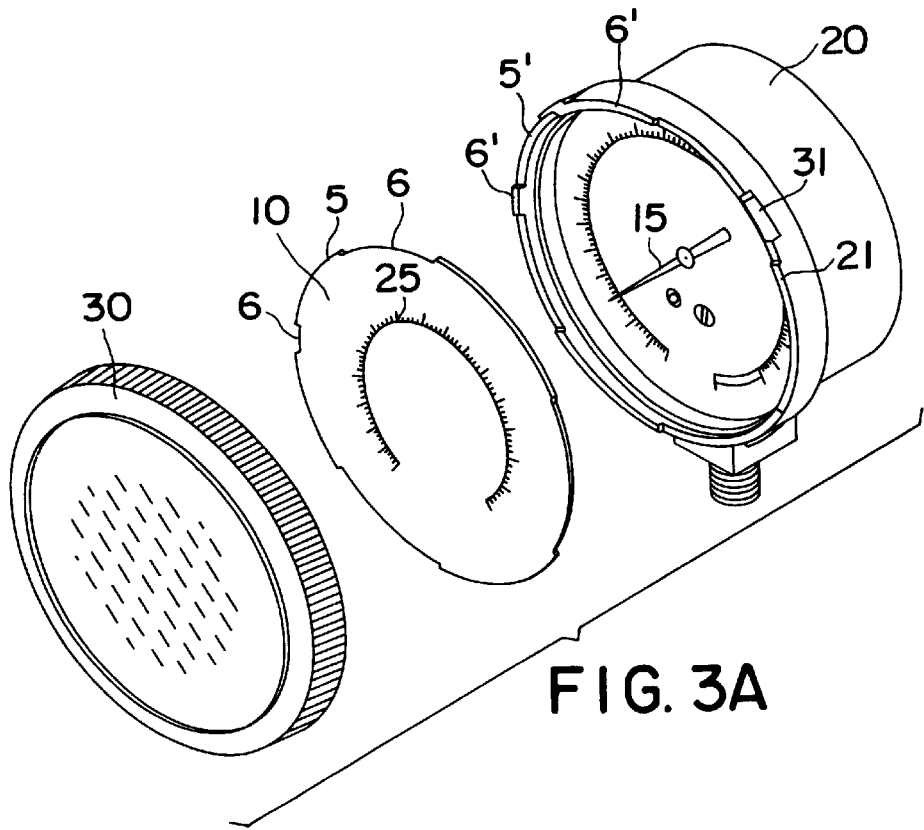
FIG. 3A is an exploded perspective view of a gauge having the dial face of FIG. 1.
Figure 3B:
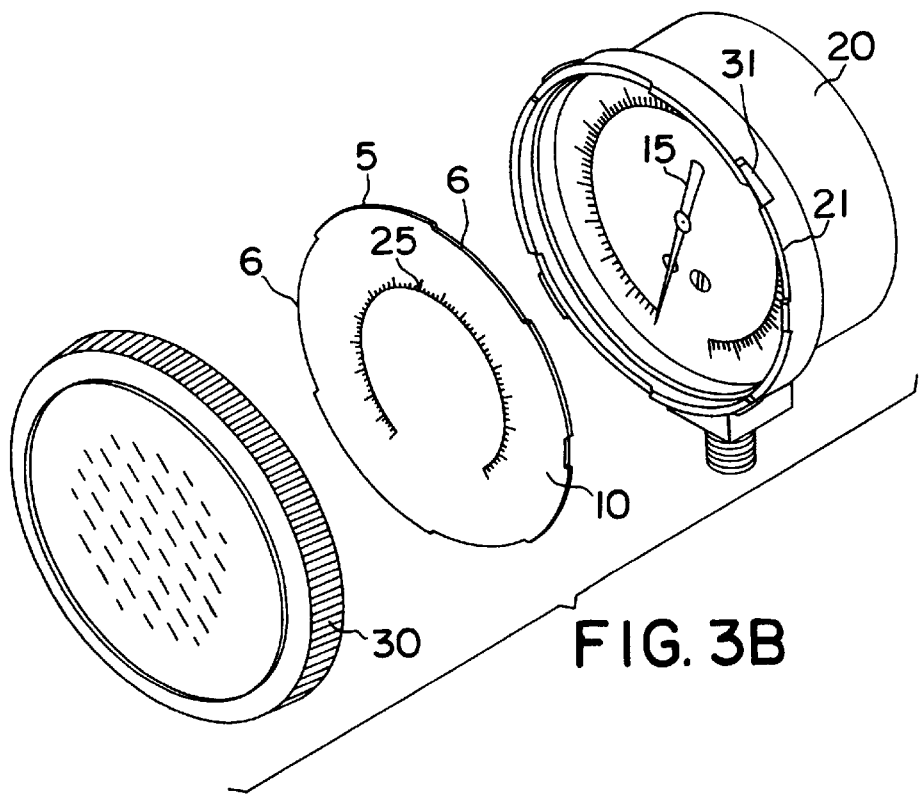
FIG. 3B is an exploded perspective view of a gauge having the dial face of FIG. 2.

FIGS. 3A and 3B illustrate one embodiment of the present invention, where the insert 10 is detachably positioned in the case or housing of device 20. Specifically, housing 20 has an outermost perimeter face 21 configured with recessed portions 5' and projections 6' respectively corresponding to projections 5 and recessed portions 6 formed on insert 10. The insert 10 is appropriately positioned in the perimeter face 21 so that each projection 5 of the insert 10 sits in a recessed portion 5' of the housing 20, and each recessed portion 6 of the insert 10 accommodates a projection 6' of the housing 20. Insert 10 is secured in place by clear (preferably plastic) cover 30, which is internally configured to lock onto the tabs 31 on housing 20 in a conventional manner well known to those skilled in the art. The projections 5 and recessed portions 6 of insert 10 (and corresponding recessed portions 5' and projections 6' of housing 20) are arranged such that the insert 10 can fit into the housing in only one position and is not rotatable. The indicia 25 appearing on insert 10 is appropriately located thereon with respect to the pointer or indicator 15 of the gauge, for example, such that calibration is proper when the insert 10 is properly located in the housing 20.

Figure 4A:
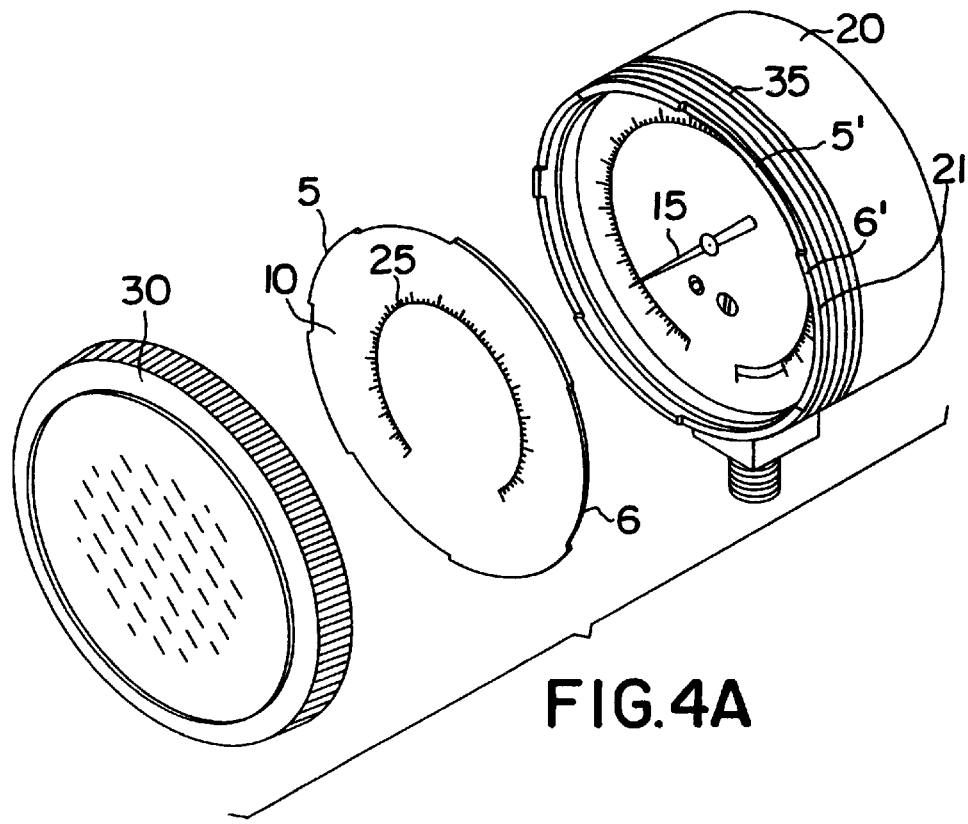
FIG. 4A is an exploded perspective view of a threaded gauge having the dial face of FIG. 1.
Figure 4B:
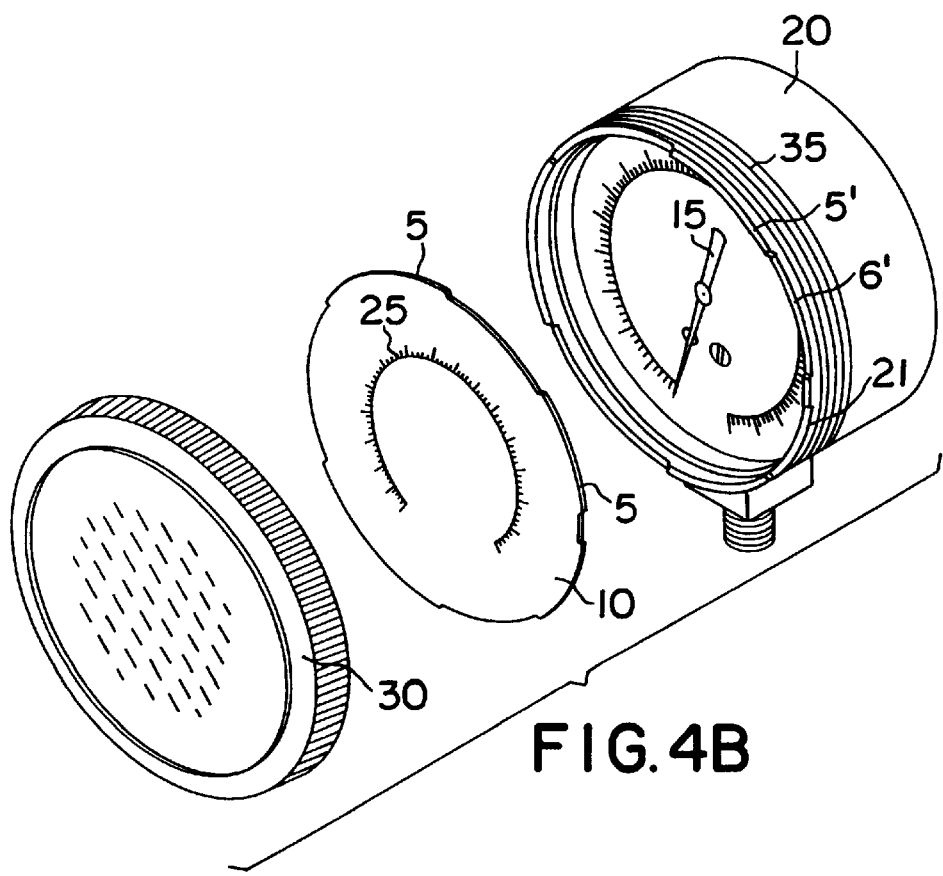
FIG. 4B is an exploded perspective view of a threaded gauge having the dial face of FIG. 2.

FIGS. 4A and 4B illustrate another embodiment of the present invention, which is similar to the embodiments of FIGS. 3A and 3B except that the cover 30 is internally threaded, and detachably fits onto corresponding threads 35 in the housing 20 so as to secure the insert 10 in place. The recessed portions 5' in the housing 20 ensure that the insert 10 is itself recessed below the outermost circumferential surface 21 of the face of the housing 20, so that the insert 10 does not interfere with the capping operation of the device; for example, the position of the insert 10 is not altered upon placing the cover 30 onto the housing and locking it thereon, regardless of whether that locking operation involves a small twisting motion (the embodiment of FIGS. 3A and 3B), a threading operation (the embodiments of FIGS. 4A and 4B), a snapping operation (the embodiments of FIGS. 5A and 5B) or some other operation.

Figure 5A:
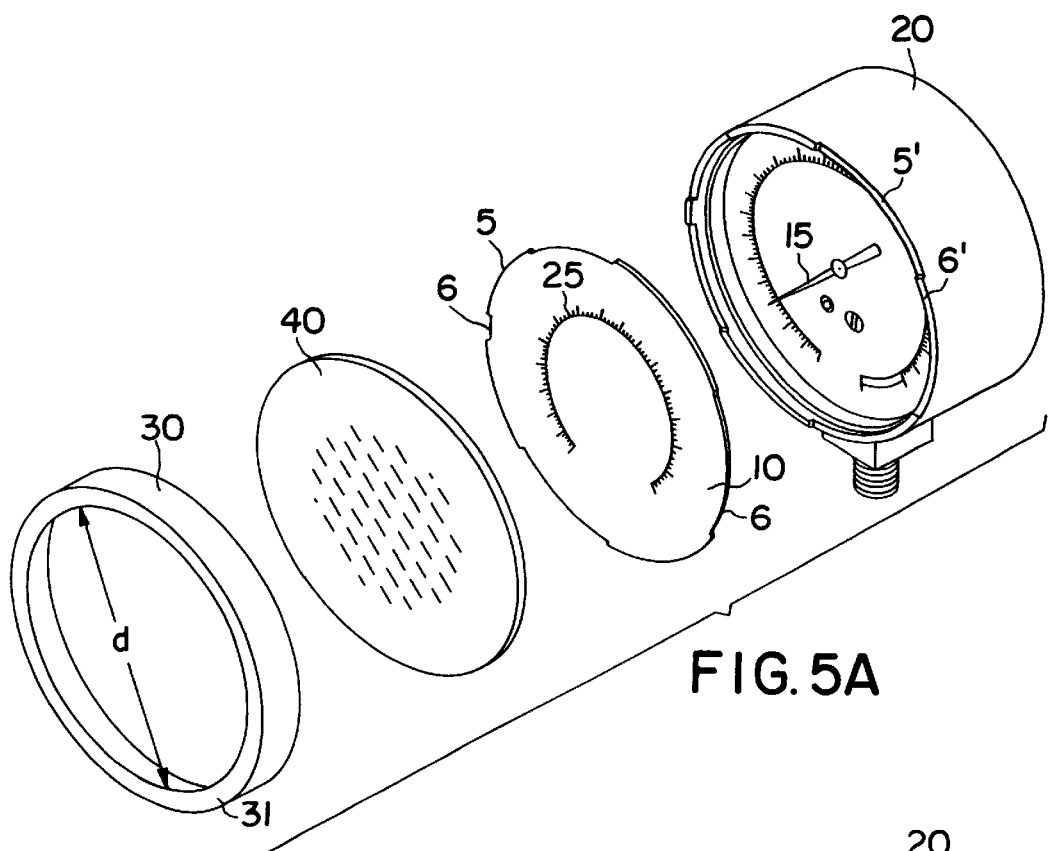
FIG. 5A is an exploded perspective view of a first embodiment of a friction ring type gauge having the dial face of FIG. 1.
Figure 5B:
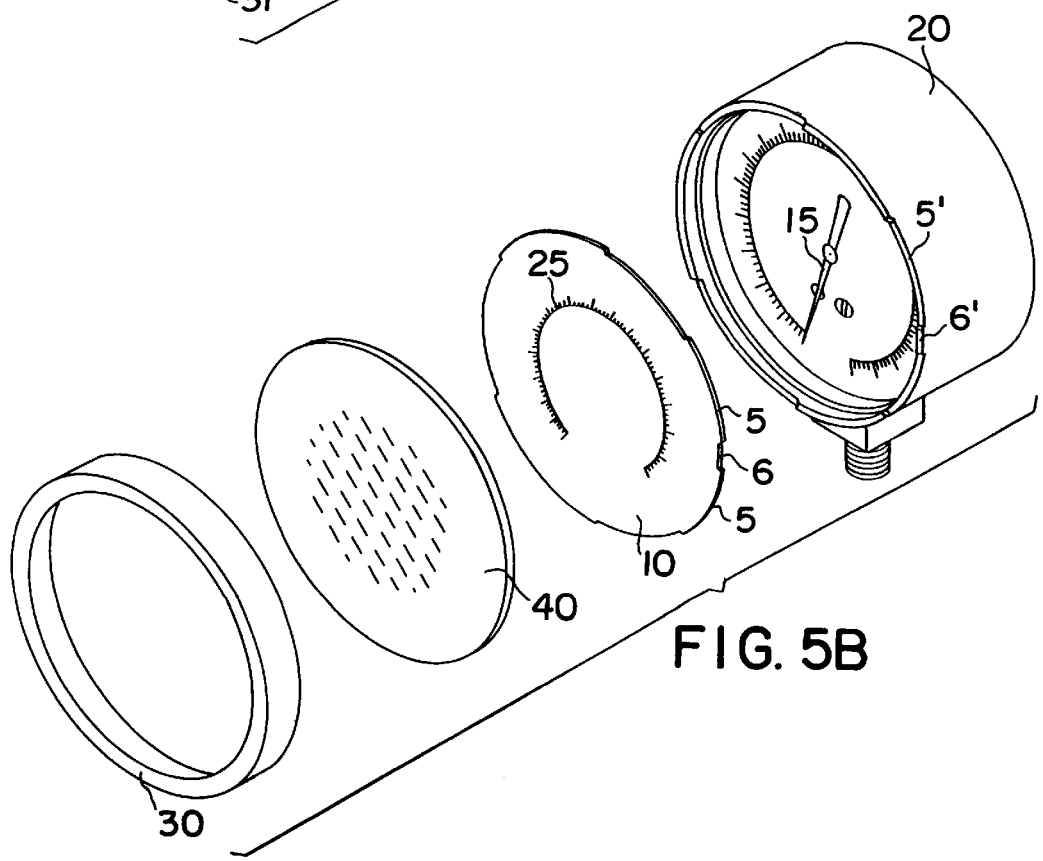
FIG. 5B is an exploded perspective view of a first embodiment of a friction ring type gauge having the dial face of FIG. 2.

FIGS. 5A and 5B illustrate yet another embodiment of the present invention, which is similar to the embodiments of FIGS. 3A and 3B except that the cover 30 is configured to create a detachable friction fit over housing 20. Thus, with insert 10 positioned in place in the housing 20, the cover 30 together with lens 40 is frictionally engaged to the outer surface of the housing 20 in a "snap" type fit. Both the lens 40 and insert 10 have diameters larger than the inner diameter "d" of the outermost ring portion 31 of cover 30 so that they are properly secured by the ring portion 31 when the cover 30 locks in place.

Figure 6A:
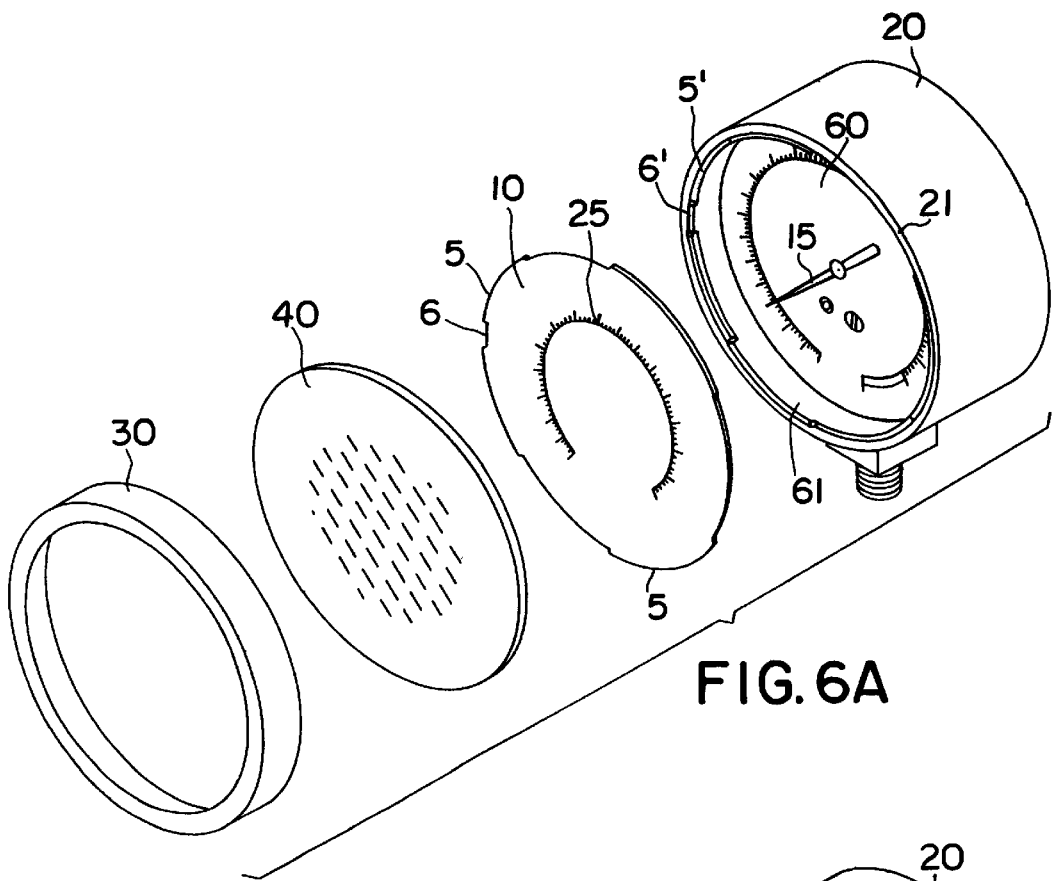
FIG. 6A is an exploded perspective view of a second embodiment of a friction ring type gauge having the dial face of FIG. 1.
Figure 6B:
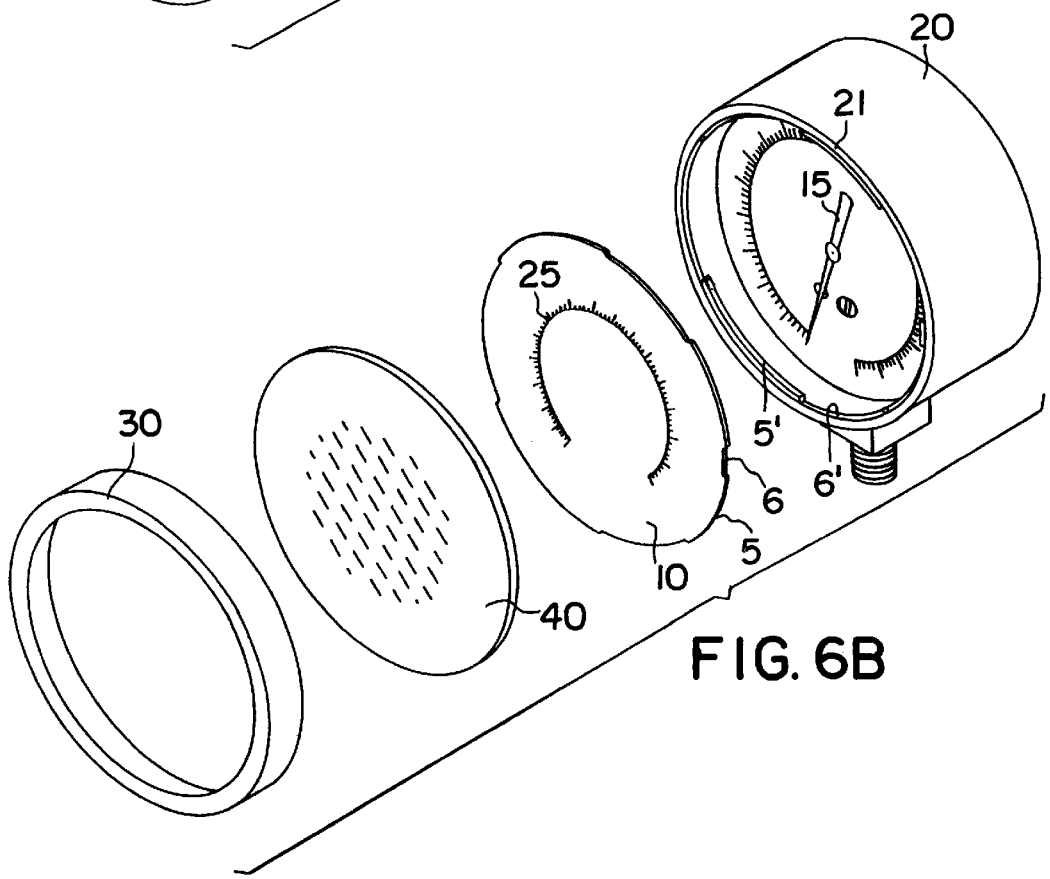
FIG. 6B is an exploded perspective view of a second embodiment of a friction ring type gauge having the dial face of FIG. 2.

FIGS. 6A and 6B illustrate a variation of the embodiment of FIGS. 5A and 5B. Specifically, the insert 10 is located within the housing 20, rather than on the outermost surface of the face of the housing 20 as in FIGS. 5A and 5B. To that end, the outermost surface 21 of the housing 20 is regular and not notched, but rather the appropriate notching (recessed portions 5' and projections 6') is located just below the outermost surface 21 within the housing 20 as shown. For example, the dial face 60 may be cupped, so that the dial face itself forms the bottom of the cup, and has an extending annular side wall 61 that terminates by the outermost portion of the housing 20. The top edge of the annular side wall 61 has the recessed portions 5' and notches 6' formed thereon as shown. Alternatively, the recessed portions 5' and notches 6' could be formed on an annular insert that is separate from the dial 60.

In each of the embodiments, the cover 30 is removably attachable to the housing 20, so that the insert 10 can be easily changed, depending upon the application (and the particular indicia desired thereon).

Figure 7:
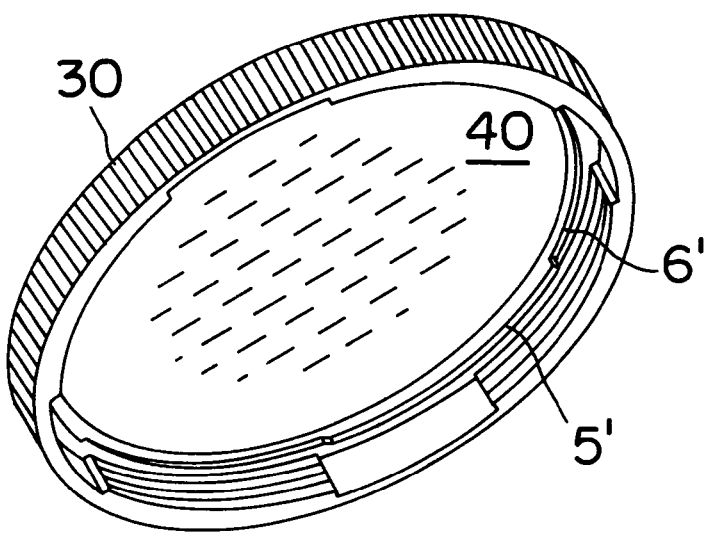
FIG. 7 is a perspective view of the housing cover in accordance with a further embodiment of the present invention.
Figure 8:
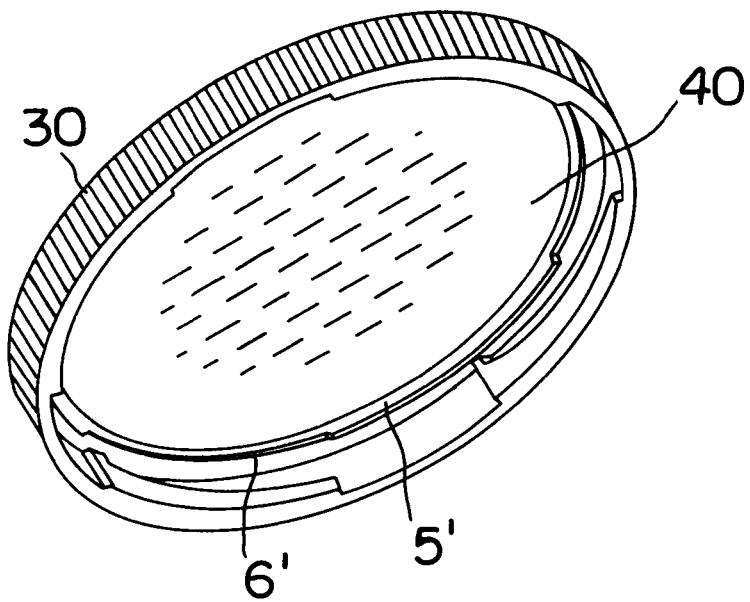
FIG. 8 is a perspective view of the housing cover in accordance with a still further embodiment of the present invention.

Those skilled in the art will appreciate that the notches corresponding to projections 5 and recessed portions 6 of insert 10 can be located in the cover 30 or the lens 40 rather the housing 20. For example, FIG. 7 shows an internally threaded cover 30 having recessed portions 5' and projections 6' positioned in close proximity to the lens 40. Similarly, FIG. 8 illustrates a cap 30 internally configured to lock onto tabs on the housing 20 as in the embodiment of FIGS. 3A and 3B, the cap 30 including recessed portions 5' and projections 6' in close proximity to the lens 40 for locating the insert 10.

The flexibility of the present invention allows for more information to be readily available to the user than can be printed on a single dial face. It also allows for interchangeability so that many different types of indicia, such as indicator scales, can be used with a given device. Since each insert 10 is keyed to a specific housing, improper inserts cannot be mistakenly used.

What is claimed is:

1. Apparatus comprising:

a housing having a face bearing indicia; indicator means associated with said indicia; a cover for said housing; and an insert bearing indicia; wherein said insert has a perimeter having a portion extending a first distance from the center of said insert, and said insert having at least one projection extending a second distance greater from said center of said insert, said second distance being greater than said first distance, and wherein said housing has at least one recess corresponding to said projection, such that said insert can be mounted to said housing in only one position.

2. The apparatus of claim 1, wherein said housing has a back end and an front end spaced from said back end, said front end being configured to receive said cover, said at least one recess being formed on said front end.

3. The apparatus of claim 1, wherein said housing further comprises a plurality of threads for removably receiving said cover.

4. The apparatus of claim 1, wherein said insert is partially opaque.

5. The apparatus of claim 1, wherein said indicator means is rotatable in said housing about an axis, and wherein said indicia on said insert is oriented circumferentially about said axis.

6. Apparatus comprising:

a housing having a face bearing indicia; indicator means associated with said indicia; a cover for said housing; and an insert bearing indicia; wherein said insert has a perimeter having a portion extending a first distance from the center of said insert, and said insert having at least one projection extending a second distance greater from said center of said insert, said second distance being greater than said first distance, and wherein said cover has at least one recess corresponding to said projection, such that said insert can be mounted to said cover in only one position.

7. The apparatus of claim 6, wherein said housing further comprises a plurality of threads for removably receiving said cover.

8. The apparatus of claim 6, wherein said insert is partially opaque.

9. The apparatus of claim 6, wherein said indicator means is rotatable in said housing about an axis, and wherein said indicia on said insert is oriented circumferentially about said axis.

* * * * *